Patented Aug. 10, 1954

2,686,182

UNITED STATES PATENT OFFICE 2,686,182

O-HYDROXY-DIHYDRO-QUINOLINE CARBOXYLIC ACIDS

Heinrich Hopff and Hermann Spaenig, Ludwigshafen (Rhine), Germany, assignors to Badische Anilin- & Soda-Fabrik Aktiengesellschaft, Ludwigshafen (Rhine), Germany No Drawing. Application December 4, 1951,
Serial No. 259,900

Claims priority, application Germany
December 7, 1950

2 Claims. (Cl. 260—287)

The present invention relates to o-hydroxy-dihydro-quinoline carboxylic acids, in particular to dihydro-4-methyl-5- or 7-hydroxy-quinoline-6-carboxylic acid, and a process for manufacturing such acids.

We have found that o-hydroxy-dihydroquinoline carboxylic acids, in particular dihydro-4-methyl-5- or 7-hydroxy-quinoline-6-carboxylic acid, have a markedly enhanced bacteriostatic effect on tubercle bacilli as compared to unsubstituted para-aminosalicylic acid and its salts.

The new acids may be prepared by heating N-γ-oxobutyl-para-aminosalicylic acid or its homologues, in particular in the form of their alkali metal salts or under the addition of an alkaline substance, in an inert solvent to from 40° to 80° C. We prefer to use methanol or any other low molecular aliphatic alcohol as the reaction medium. The primary reaction product is the alkali metal salt from which the free acid may be easily prepared by acidification.

The reaction proceeds according to the following equation:

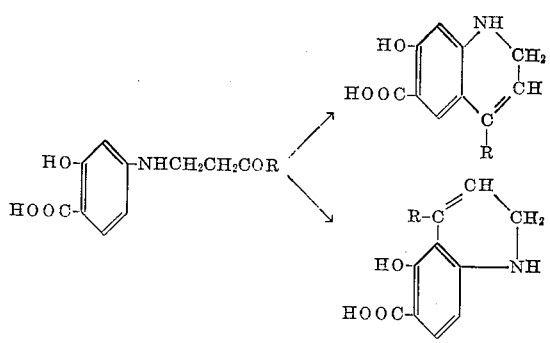

wherein R stands for methyl or one of its higher homologues.

To prepare N-oxoalkyl-para-aminosalicylic acids used as starting materials we may use various methods. For example, we may cause a suitable α,β-unsaturated ketone, e. g. vinylmethyl ketone, or a saturated β-halogeno ketone, e. g. chloro- or bromo-ethyl-methyl ketone, to act on para-aminosalicylic acid or a soluble salt thereof, preferably in water, alcohols or other inert solvents. Thus we may obtain N-γ-oxobutyl-para-aminosalicylic acid by the reaction between equimolecular proportions of vinylmethyl ketone and para-aminosalicylic acid. When using a β-halogenated saturated ketone instead of the vinyl ketone, the same result may be achieved.

In this case it is preferred to carry out the reaction in the presence of an agent capable of binding the hydrogen halide set free in the introduction of the ketone radicle. The nature of this agent is not critical. We have found that pyridine or sodium carbonate or bicarbonate are most suitable.

We may also introduce the ketone radicle into the para-aminosalicylic acid by adding water under the influence of acid mercuric salts to the triple linkage in N-3-butinyl-para-aminosalicylic acids or their salts. It may be even more convenient to combine this catalytic addition of water with the introduction of the butinyl group into the para-aminosalicylic acid. We may so, for example, treat para-aminosalicylic acid with vinyl acetylene in the presence of water, preferably in the presence of an organic solvent miscible with water, and in the presence of an acid mercuric salt, such as mercuric sulfate, and we obtain in one reaction N - γ - oxobutyl-para-aminosalicylic acid or the N.N - di - γ - oxobutyl-para-aminosalicylic acid.

From either one of the reaction mixtures obtained as described we may produce the o-hydroxy-dihydro-quinoline carboxylic acids without isolating the N-oxoalkyl-para-aminosalicylic acids. It is sufficient to heat the reaction mixture, if necessary, after having added an alkaline substance, e. g. caustic soda, to from 40° to 80° C. for some time.

The o-hydroxy-dihydro-quinoline carboxylic acids and their salts are well-defined crystallized compounds. It is very simple to convert the salts into the free acids and vice versa. The free acids are difficultly soluble in water. The alkali metal and alkali earth metal salts are more water-soluble. It is, therefore, preferable to use these salts in the practical application of the new para-aminosalicylic acid derivative.

The following example will further illustrate how our invention may be carried out in practice, but it is in no way restricting our invention. The parts are by weight.

*Example*

To a solution of 2110 parts of the sodium salt of para-aminosalicylic acid in 2000 parts of methanol 770 parts of vinylmethyl ketone are slowly added at 30° to 35° C. The whole is stirred for further one hour, while allowing the temperature to rise to 55° C., and the methanol removed by vacuum distillation. The residue is dissolved in water and acidified with acetic acid after short warming. Dihydro-4-methyl-7-hydroxy-quinoline-6-carboxylic acid having the formula:

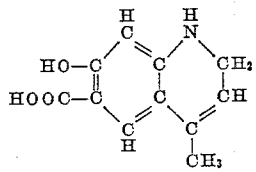

is obtained as a yellowish solid. By redissolving in aqueous sodium bicarbonate and precipitation with acid, the product may be further purified to form crystals melting from 203° to 205°.

We claim:
1. o - Hydroxy - dihydro - quinoline carboxylic acids of the general formula:

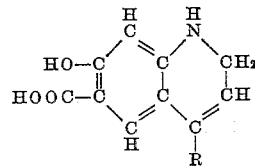

wherein R is a lower alkyl radical.

2. The dihydro-4-methyl-7-hydroxy-quinoline-6-carboxylic acid having the formula:

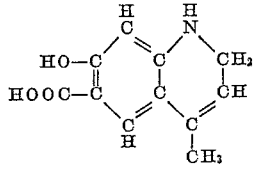

References Cited in the file of this patent
Beilstein: "Handbuch der organischen Chemi," vol. 27, p. 212 (1937).